Figure 1:
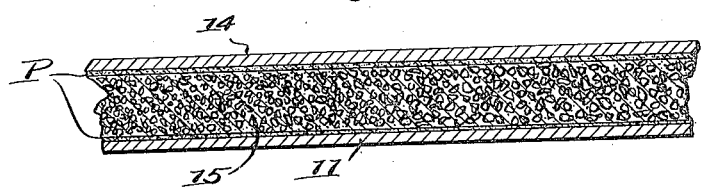

June 11, 1929.   A. H. AVERY   1,716,364

SHOE BOTTOM FILLER PIECE

Filed Aug. 6, 1927

Inventor
Alfred H. Avery,
by Roberts Cushman & Woodberry
his Attorneys.

Patented June 11, 1929.

1,716,364

UNITED STATES PATENT OFFICE.

ALFRED H. AVERY, OF MALDEN, MASSACHUSETTS, ASSIGNOR TO NORTH AMERICAN CHEMICAL COMPANY, OF BOSTON, MASSACHUSETTS, A CORPORATION OF MASSACHUSETTS.

SHOE-BOTTOM FILLER PIECE.

Application filed August 6, 1927. Serial No. 211,219.

One of the principal objects of that form of shoe-bottom filler which as an article of manufacture is furnished in the form of a sheet-like piece, particularly for filling McKay shoes, is to be able to lay the filler expeditiously by spreading it in the shoe-bottom after the shoe-bottom has been formed or enclosed by the securing of the outer sole and the other shoe parts together. This spreading is then accomplished by applying pressure to the outer sole which is transmitted to the filler piece which is then between the outer sole and the inner-sole, and by reason of said pressure the desired spreading or expansion takes place. This results in the filler being laid properly.

My present invention is an improvement in said filler piece to facilitate or render more expeditious the above explained laying of the filler in the shoe-bottom. The type of filler piece usually employed as above consists of filler material interposed as a layer between two webs or sheet-like skins or cover layers. My invention resides in so making the piece that the webs or skins are substantially non-resistant to lateral movement with relation to the adjacent filler layer, this relation being secured preferably by lubricating said webs or skins on their faces next to the filler material. Preferably I coat the inner surfaces of the paper or other protective sheet with petrolatum, vaseline, or unctuous slippery powder, or other suitable lubricant before bringing it into contact with the filler compound or filler layer, so that, when pressure is thereafter applied, the filler material or layer may slip and slide freely without restraint relatively to the paper or other enclosing skin or supporting cover. Instead of this lubrication a substantially non-resistant combination may be secured by employing a skin having a slippery surface such as cellophane, glassine, or special paper made with such an inner surface. This renders the filling operation quicker and insures its completeness by avoiding any tendency of the filler to bunch or crawl due to adhesion to the protective web, skin or cover. Also this construction renders it convenient, if desired, to strip off the protective cover so as to expose the inner filler layer, which is desirable in some instances in case the said layer is inherently sticky or capable of being rendered sticky or otherwise usable without the cover. Preferably the outside surface of such a filler piece is adhesive, either latent or active.

In the drawings

Figure 2:
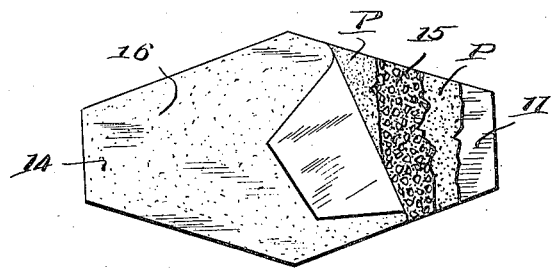

Fig. 1 is a vertical sectional view on a much enlarged scale of a preferred embodiment of the filler piece; and Fig. 2 is a plan view thereof parts broken away to illustrate its structure.

Referring to the drawings, the intermediate layer 15 of filler material is shown as embraced by opposite webs, skins or enclosing layers or protective covers 11, 14, all of these names for these elements being employed in this art. The filler material itself may be any of the kinds of plastic shoe filler materials well known in the art capable of spreading relatively to the adjacent skin or cover. So likewise the covers 11 and 14 may be any suitable material, preferably paper-like or in thin sheets. My present improvement resides in providing a coating or film P of slippery substance between the filler layer 15 and the adjacent cover 11 on one side and 14 on the other side, provided said filler piece has two covers. The filler piece may have only one cover in which case there will be only one layer P of slippery substance. The slippery substance as already stated may be any material capable of effecting a quick sliding movement or tendency or in other words any substance capable of rendering the filler layer more readily movable or slippery with relation to the cover or covers 11, 14. While petrolatum, vaseline or any grease is the more practical usually, any unctuous slippery substance, such as graphite, talc, magnesium, soapstone and the like may be used or substances in which the lubricating element is normally inactive but capable of being rendered active by any well known means, as for instance a layer of starch, powdered glue, dextrine and the like which becomes highly lubricating in effect upon dipping the filler piece in water. Another illustrative example is litharge which would be rendered highly slippery by glycerine, a construction practical in case the protecting skin should be very thin or porous paper or other covering for instance which would be readily penetrated by a dilute solution of glycerine.

Also one or both of the covers or skins 11, 14, instead of being provided with an unctuous surface may be so smooth and of such composition as to have in itself the required slipperiness. For example cellophane, glassine, are such types as already mentioned. By pressing these hard upon the filler layer so as to exclude all air they cling to the filler sufficiently for shipping purposes i. e. they have no tendency to drop off but nevertheless they are substantially non-resistant to lateral movement of the layer 15. If such a substance is used for the skin 11, 14 the coating or film P is omitted. Any of the films above mentioned in which the skin is non-resistant to lateral movement either by reason of its own inherent surface qualities or because of a coating is rendered more usable by having its outer surface adhesive as by glue or other adhesive thereby securing its immovable positioning in the shoe by reason of its outer surface instead of as heretofore by its resistant relation to the filler layer 15. If an active adhesive is used it is dulled by a sprinkling of transient material, talc, cork powder or the like, making a layer 16.

In view of the above explanation it will be understood that my invention is intended to be broad in respect to the improvement described, or as defined further in the appended claims.

Claims:

1. A shoe filler piece, comprising a layer of filler material and a protective skin or cover on one side at least, which is substantially non-resistant to the lateral movement of the filler material.

2. A shoe filler piece, comprising a layer of filler material and a protective skin or cover on one side at least which is substantially non-resistant to the lateral movement of the filler material, and having an outer adhesive surface.

3. A shoe filler piece, comprising a layer of filler material and a protective skin or cover, having between them a coating of material with capacity of becoming slippery with relation to said layer and skin so as to promote free movement of one with relation to the other.

4. A shoe filler piece, comprising a sheet-like layer of filler material, a protective skin therefor, and a normally slippery coating between them.

5. A shoe filler piece, comprising a sheet-like layer of sticky filler material, a protective skin therefor, and means rendering said skin substantially non-adherent to the sticky filler layer.

6. A shoe filler piece, comprising a sheet-like layer of filler material, a protective skin therefor, and a coating between said skin and filler material of unctuous substance.

7. A shoe filler piece, comprising a sheet-like layer of filler material, interposed between protective skins, the inner surfaces of said skins being coated with a lubricant.

8. A shoe filler piece, comprising a sheet-like layer of sticky filler material, a protective skin therefor, and means rendering said skin substantially non-adherent to the sticky filler layer, said protective skin having an adhesive outer surface.

Signed by me at Boston, Massachusetts, this fourth day of August, 1927.

ALFRED H. AVERY.